United States Patent
Pintsov

Patent Number: 5,881,172
Date of Patent: Mar. 9, 1999

[54] HIERARCHICAL CHARACTER RECOGNITION SYSTEM

[75] Inventor: David A. Pintsov, San Diego, Calif.

[73] Assignee: Mitek Systems, Inc., San Diego, Calif.

[21] Appl. No.: 761,845

[22] Filed: Dec. 9, 1996

[51] Int. Cl.⁶ .............................. G06K 9/68; G06K 9/70
[52] U.S. Cl. ............................................ 382/227; 382/310
[58] Field of Search ................................... 382/224, 226, 382/227, 229, 231, 310, 321, 187

[56] References Cited

U.S. PATENT DOCUMENTS

| | | | |
|---|---|---|---|
| 4,589,142 | 5/1986 | Bednar | 382/226 |
| 4,876,735 | 10/1989 | Martin et al. | 382/310 |
| 5,418,864 | 5/1995 | Murdock et al. | 382/226 |
| 5,519,786 | 5/1996 | Courtney et al. | 382/310 |

*Primary Examiner*—Phuoc Tran
*Attorney, Agent, or Firm*—Fish & Richardson P.C.

[57] ABSTRACT

A method and apparatus for hierarchical character recognition processing of ambiguous and noisy characters which produces highly reliable results at high levels of hierarchical processing. The invention first applies a universal classifier system (which may comprise one or more universal classifiers) to input image data, and identifies "suspicious" characters. The image data for suspicious characters is then applied to a "specialist" classifier that is designed to handle only a narrow and well-defined set of recognition cases. This hierarchical processing architecture and method results in increased accuracy of recognition. The method is particularly applicable to handwritten characters and to distorted and noisy machine-printed characters.

3 Claims, 2 Drawing Sheets

HIERARCHICAL CHARACTER RECOGNITION SYSTEM

BACKGROUND OF THE INVENTION

1. Field of the Invention

This invention relates to character recognition systems.

2. Description of Related Art

Character recognition, such as optical character recognition (OCR), involves scanning of documents and automated recognition of machine-printed or handwritten characters. FIG. 1 is a block diagram of a typical prior art OCR system. Documents 1 are passed through a scanner 2 which generates image data 3. The image data 3 is applied to a processor 4 (such as a general purpose computer) suitably programmed with character recognition computer programs (while most current OCR systems are software based, an equivalent system can be implemented completely in hardware).

The processor 4 produces a set of characters (typically coded in ASCII) of some or all of the scanned document as output. The character recognition system has to locate fields of interest (which may be the whole document, as in the case of typed pages) in the scanned image data 3, extract individual characters from the fields of interest, recognize these characters, and produce codes for each of the recognized characters.

Real-world images and characters frequently suffer from a number of degradations (such as worn out typewriter ribbons, missing pins in dot-matrix printers, skipping ball-point pens, poor quality handwriting, deficiencies in the scanning process, etc.). Accordingly, a character recognition system must be able to provide a degree of confidence in its results to be of practical use. This degree of confidence can relate to the recognized document or fields in the document, but certainly must be present for individual recognized characters. With ambiguous or noisy characters, an OCR system can assign several potential identities to the image data comprising a character. These identities are usually rank ordered by a confidence factor, so that the most probable identity of the character has the highest confidence, the next most probable identity has the next highest confidence, etc.

Traditionally, OCR programs have been designed and utilized as single pass, single classifier systems, an example of which is shown in FIG. 2. Image data 3 is applied to a "universal" classifier 5 which outputs machine-readable data, typically in ASCII 6 form. A universal classifier is designed to recognize a large set of characters such as letters, numbers, or alphanumeric characters. A drawback of single pass, single classifier systems is that recognition frequently fails when the classifier is confronted with ambiguous characters (e.g., "I", "l", and "1") or "noisy" (i.e., poorly formed) characters.

More recently, OCR systems have utilized multiple universal classifiers in conjunction with a "voting" algorithm to select the output of one of the classifiers. FIG. 3 is a block diagram of a prior art multiple universal classifier system, in which image data 3 is applied to some or all of n universal classifiers 5, the outputs of which are coupled to a voting function 7. The universal classifiers 5 are trained for different characteristics or use different recognition algorithms. The voting function 7 may be any one of several algorithms which compare or combine the outputs of the universal classifiers 5 to arrive at a (presumably) more reliable character recognition. The voting function 7 then outputs a character code 6. While multiple universal classifier systems give improved recognition compared to single pass, single classifier systems, such systems would benefit from further improvements.

Accordingly, the inventor has recognized a need for a better character recognition system. The present invention meets this need.

SUMMARY OF THE INVENTION

The invention comprises a method and means for hierarchical character recognition processing of ambiguous and noisy characters which produces highly reliable results at high levels of hierarchical processing. The invention first applies a universal classifier system (which may comprise one or more universal classifiers) to input image data, and identifies "suspicious" characters. A suspicious character may be determined based upon any desired criteria, such as apparent size, the type of character, level of gray in the image of the character, styles of handwriting, prior knowledge that a character candidate has been "surgically" separated from an adjoining character, or upon assignment of a character candidate by the universal classifier system to a predefined character groups known to be ambiguous (e.g., the pair "4" and "9"; the group "I", "l" "1", etc.). The image data for suspicious characters is then applied to a "specialist" classifier that is designed to handle only a narrow and well-defined set of recognition cases. These specialist classifiers normally have only a few outputs (for example, 2 or 3 possible characters). This hierarchical processing architecture and method results in increased accuracy of recognition. The method is particularly applicable to handwritten characters and to distorted and noisy machine-printed characters.

The details of the preferred embodiment of the invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the invention.

Overview

The shapes of modern characters have evolved over millennia into a number of classes of morphologically similar characters. Unfortunately, similarity exists even between characters of different classes sufficient to create ambiguities in the recognition of such classes. For example, "I", "l", and "1" have rather similar shapes to a recognition system, as do "S" and "5", "4" and "9", "3" and "8", and several other "ambiguity" classes. The correct identification of such ambiguous characters requires extensive recognition capabilities or the presence of context. The larger the set of characters, the more ambiguity classes it possesses. A universal classifier that is designed to recognize a full set of characters (such as all alphabetic characters and/or all numeric characters) is regularly overwhelmed by morphologically similar characters that humans normally assign to different classes.

To overcome this problem with universal classifiers, the invention employs a hierarchy of "specialist" classifiers, each configured to recognize characters belonging to distinct ambiguity classes. That is, each special classifier is trained or built using known principles to distinguish only the differences between characters in an ambiguity class (e.g., "4" and "9"); the special classifiers are not designed to process characters of other shapes. A classifier of this kind is trained (built) only on a large set of characters that belong to a specific ambiguity class.

The specialist classifiers may be implemented in any desired fashion, using, for example, feature extraction algorithms such as neural networks and syntactic or linguistic algorithms, "nearest neighbor" algorithms, and other algorithms known in the art of character recognition. The distinctive feature of the invention is that the full power of such methods is brought to bear on a specific ambiguity class (e.g., "3" and "8", etc.).

EXAMPLE EMBODIMENT

Figure 1:
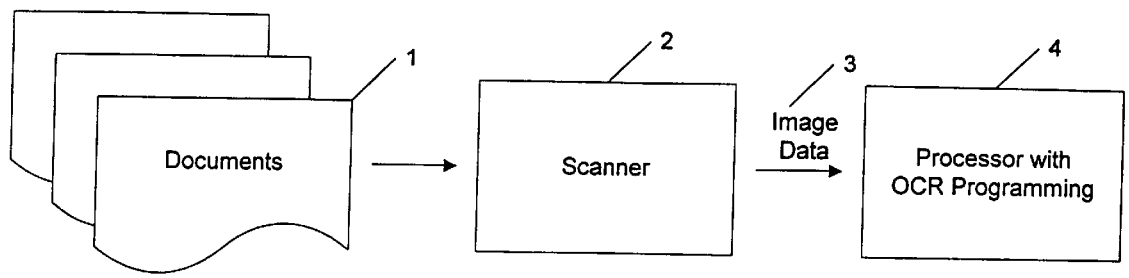
FIG. 1 is a block diagram of a typical prior art OCR system.
Figure 2:
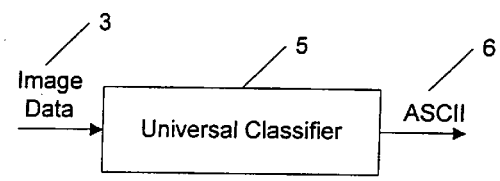
FIG. 2 is a block diagram showing a prior art single pass, single classifier system.
Figure 3:
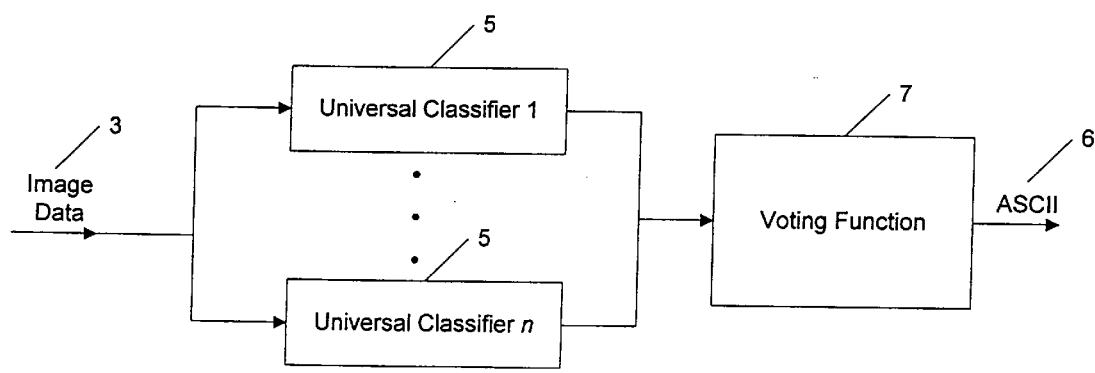
FIG. 3 is a block diagram of a prior art multiple universal classifier system.
Figure 4:
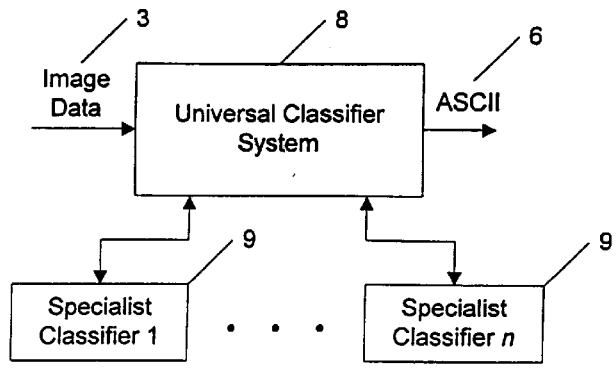
FIG. 4 is a block diagram showing the basic architecture of the invention.

FIG. 4 is a block diagram showing the basic architecture of the invention. Image data 3 is applied to a universal classifier system 8, which can comprise one or more universal classifiers of the types known in the prior art. For unambiguous data, the universal classifier system 8 outputs a character code 6.

However, added to the universal classifier system 8 is the ability to "call" a specialist classifier 9 trained or built to recognize ambiguous image data supplied from the universal classifier system 8. Any particular specialist classifier 9 is selected based upon the probable identity of a candidate character, as determined by the universal classifier system 8, and whether the candidate character is "suspicious". A suspicious character may be determined based upon any desired criteria, such as apparent size, the type of character, level of gray in the image of the character, styles of handwriting, prior knowledge that a character candidate has been "surgically" separated from an adjoining character, or upon assignment of a character candidate by the universal classifier system to a predefined character groups known to be ambiguous (e.g., the pair "4" and "9"; the group "I", "l", "1", etc.). The "called" specialist classifier 9 analyzes the image data by performing a recognition algorithm tailored to the candidate character and then outputs a probable character code 6.

Figure 5:
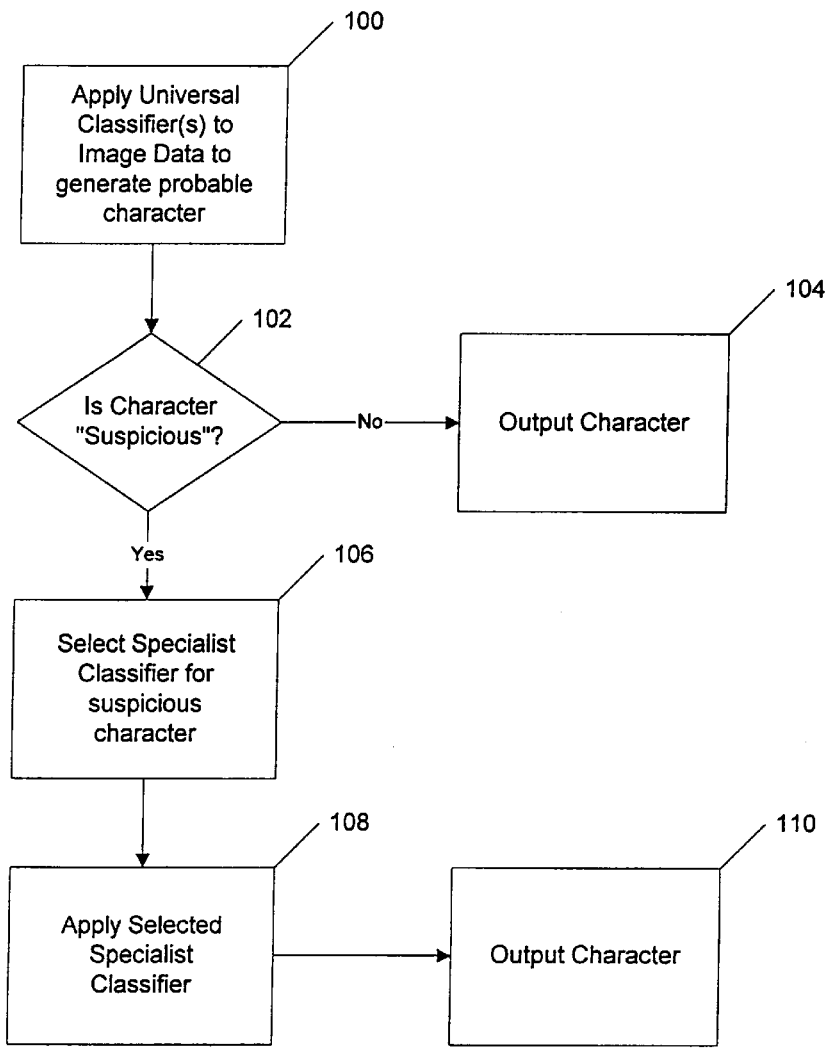
FIG. 5 is a flow chart showing one embodiment of the invention.

FIG. 5 is a flow chart showing one embodiment of the invention. One or more universal classifiers 8 are applied to image data 3 to generate a probable character (step 100). A determination is then made as to whether the character is "suspicious". For example, the character may have been recognized by a universal classifier system 8 as probably being a "4". The universal classifier system 8 can be pre-programmed, for example, to always recognize that a "4" is a suspicious character because it is often mistaken for a "9" (particularly with handwritten characters). Thus, the candidate character is part of the ambiguity class containing "4" and "9".

If the character is not suspicious, then the probable character determined by the universal classifier system 8 is output as a code 6 (step 104). If the character is suspicious (step 102), a specialist classifier 9 for the suspicious character is selected (step 106). The selected specialist classifier 9 is then applied to that image data 3 (step 108) and determines the most probable character to be assigned to the image data 3. That character is then output as a code 6 (step 110). Note that the character determined by the selected specialist classifier may be the same character determined as being most probable by the universal classifier system 8.

Implementation

The invention may be implemented in hardware (digital, analog, or hybrid digital-analog) or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

In one implementation of the invention, use of specialist classifiers improved the error-rate by about 40% compared to the same system without specialist classifiers.

A number of embodiments of the invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A hierarchical recognition system including:
   (a) a universal classifier system for recognizing a probable character from input image data, for determining if the probable character is a suspicious character, and for outputting a character code for each non-suspicious character;
   (b) at least one specialist classifier, each for recognizing a distinct ambiguity class of characters, and selectably coupled to the universal classifier system;
   (c) means for selecting and applying a specialist classifier corresponding to each suspicious character, whereby the selected specialist classifier outputs a character code for each suspicious character.

2. A method for recognizing characters from input image data, comprising the steps of:
   (a) recognizing a probable character from the input image data;
   (b) determining if the probable character is a suspicious character;
   (c) outputting a character code for each non-suspicious character, and otherwise selecting a specialist classifier, configured to recognize a distinct ambiguity class of characters, corresponding to each suspicious character;
   (d) recognizing each suspicious character with the selected specialist classifier; and
   (e) outputting a character code for each suspicious character.

3. A computer program, residing on a computer-readable medium, for recognizing characters from input image data, the computer program comprising instructions for causing a computer to:
   (a) recognize a probable character from the input image data;
   (b) determine if the probable character is a suspicious character;
   (c) output a character code for each non-suspicious character, and otherwise select a specialist classifier, configured to recognize a distinct ambiguity class of characters, corresponding to each suspicious character;
   (d) recognize each suspicious character with the selected specialist classifier; and
   (e) output a character code for each suspicious character.

* * * * *